United States Patent
Kashihara et al.

(10) Patent No.: US 7,355,310 B2
(45) Date of Patent: Apr. 8, 2008

(54) PERMANENT MAGNET SYNCHRONOUS MOTOR

(75) Inventors: Keizo Kashihara, Yamatokoriyama (JP); Kazuhiko Matsumoto, Yamatokoriyama (JP); Masaru Horikawa, Yamatokoriyama (JP)

(73) Assignee: Mori Seiko Co., Ltd., Yamatokoriyama-shi (JP)

( * ) Notice: Subject to any disclaimer, the term of this patent is extended or adjusted under 35 U.S.C. 154(b) by 0 days.

(21) Appl. No.: 11/261,779

(22) Filed: Oct. 31, 2005

(65) Prior Publication Data

US 2006/0091753 A1  May 4, 2006

(30) Foreign Application Priority Data

Nov. 4, 2004  (JP) .............................. 2004-320161

(51) Int. Cl.
*H02K 21/12*  (2006.01)

(52) U.S. Cl. ............................ 310/156.12; 310/156.18; 310/156.36

(58) Field of Classification Search ........... 310/156.36, 310/156.37, 156.47, 112, 114, 156.12, 156.13, 310/156.21, 156.26
See application file for complete search history.

(56) References Cited

U.S. PATENT DOCUMENTS

| | | | | |
|---|---|---|---|---|
| 4,009,406 | A | * | 2/1977 | Inariba ........................ 310/164 |
| 5,111,094 | A | * | 5/1992 | Patel et al. ............. 310/156.22 |
| 6,252,323 | B1 | * | 6/2001 | Nishikawa et al. .... 310/156.01 |

FOREIGN PATENT DOCUMENTS

JP   2000-308286   11/2000

* cited by examiner

*Primary Examiner*—Dang Le
(74) *Attorney, Agent, or Firm*—Westerman, Hattori, Daniels & Adrian, LLP.

(57) ABSTRACT

A permanent magnet synchronous motor is of a rotating magnetic field type, and includes a stator which generates a rotating magnetic field, and a rotor having fixed magnetic poles. The rotor includes first and second rotor units arranged axially thereof. The first and second rotor units each have a rotor core, and permanent magnet pieces bonded on the outer peripheral surface of the rotor core. The rotor cores of the first and second rotor units are engaged with each other. The rotor cores each have pin insertion holes into which guide pins are inserted to position the rotor units in proper circumferential positional relation with respect to each other when the rotor cores are connected to each other by bolts.

2 Claims, 3 Drawing Sheets

PERMANENT MAGNET SYNCHRONOUS MOTOR

BACKGROUND OF THE INVENTION

1. Field of the Invention

The present invention relates to a permanent magnet synchronous motor which employs permanent magnets for a rotor.

2. Description of Related Art

Permanent magnet synchronous motors typically include a rotor which is rotated by torque applied to magnetic poles of the rotor by a rotating magnetic field generated by applying an alternating current to a stator. The rotor typically includes a rotor core and two types of elongated planar permanent magnets having different polarities and alternately bonded to the outer peripheral surface of the rotor core (see Japanese Unexamined Patent Publication No. 2000-308286).

When the permanent magnets are bonded to the outer peripheral surface of the rotor core (magnetic body), magnetic attractive forces of the permanent magnets act on the rotor core. Therefore, a jig holding each of the permanent magnets should be gradually moved toward the outer peripheral surface of the rotor core to bond the permanent magnets to the rotor core.

To increase the torque of the permanent magnet synchronous motor, it is necessary to increase the diameter or length of the motor. However, where the motor length is increased, the lengths of the permanent magnets to be bonded to the outer peripheral surface of the rotor core should be increased. Therefore, when the permanent magnets are bonded to the rotor core, the accuracy of the bonding of the permanent magnets to the rotor core is reduced. This may result in uneven rotation of the rotor.

Where it is desired to increase the torque of the permanent magnet synchronous motor but the diameter of the motor is restricted, a plurality of permanent magnet synchronous motors are connected axially to each other. However, the permanent magnet synchronous motors each have rotor-absent-portions at coil ends thereof. With the permanent magnet synchronous motors connected to each other, spaces noncontributory to the increase of the torque are present at junctions between the permanent magnet synchronous motors. Therefore, the size of the entire motor is increased as compared with a case in which the torque is increased by increasing the length of the motor. Further, motor control is more difficult.

It is therefore an object of the present invention to provide a permanent magnet synchronous motor in which permanent magnets bonded to the outer peripheral surface of a rotor core are less liable to be damaged and a rotor is substantially free from uneven rotation even if the motor has an increased length.

SUMMARY OF THE INVENTION

According to the present invention, there is provided a permanent magnet synchronous motor which comprises a tubular stator and a rotor inserted in the stator. The rotor includes a plurality of rotor units arranged axially thereof. The rotor units each include a rotor core and two types of permanent magnets having different polarities and alternately bonded on an outer peripheral surface of the rotor core. The rotor further includes coupling means which couples the axially arranged rotor units, and positioning means which positions the axially arranged rotor units in proper circumferential positional relation with respect to each other with the polarities of the corresponding permanent magnets of the respective rotor units matching each other without circumferential positioning offset between the corresponding permanent magnets of the respective rotor units.

In the inventive permanent magnet synchronous motor, as described above, the rotor includes the plurality of rotor units arranged axially thereof. Therefore, the permanent magnets of the respective rotor units each have a reduced length, so that the permanent magnets can be bonded to the rotor cores of the respective rotor units at sufficiently high accuracy.

In addition, when the rotor units are combined together by the coupling means, the axially arranged rotor units are positioned in proper circumferential relation with respect to each other by the positioning means with the polarities of the corresponding permanent magnets thereof matching each other without circumferential positioning offset between the corresponding permanent magnets of the respective rotor units. Therefore, the rotor is free from uneven rotation.

The foregoing and other objects, features and effects of the present invention will become more apparent from the following description of the preferred embodiment with reference to the attached drawings.

DESCRIPTION OF THE PREFERRED EMBODIMENT

Figure 1:
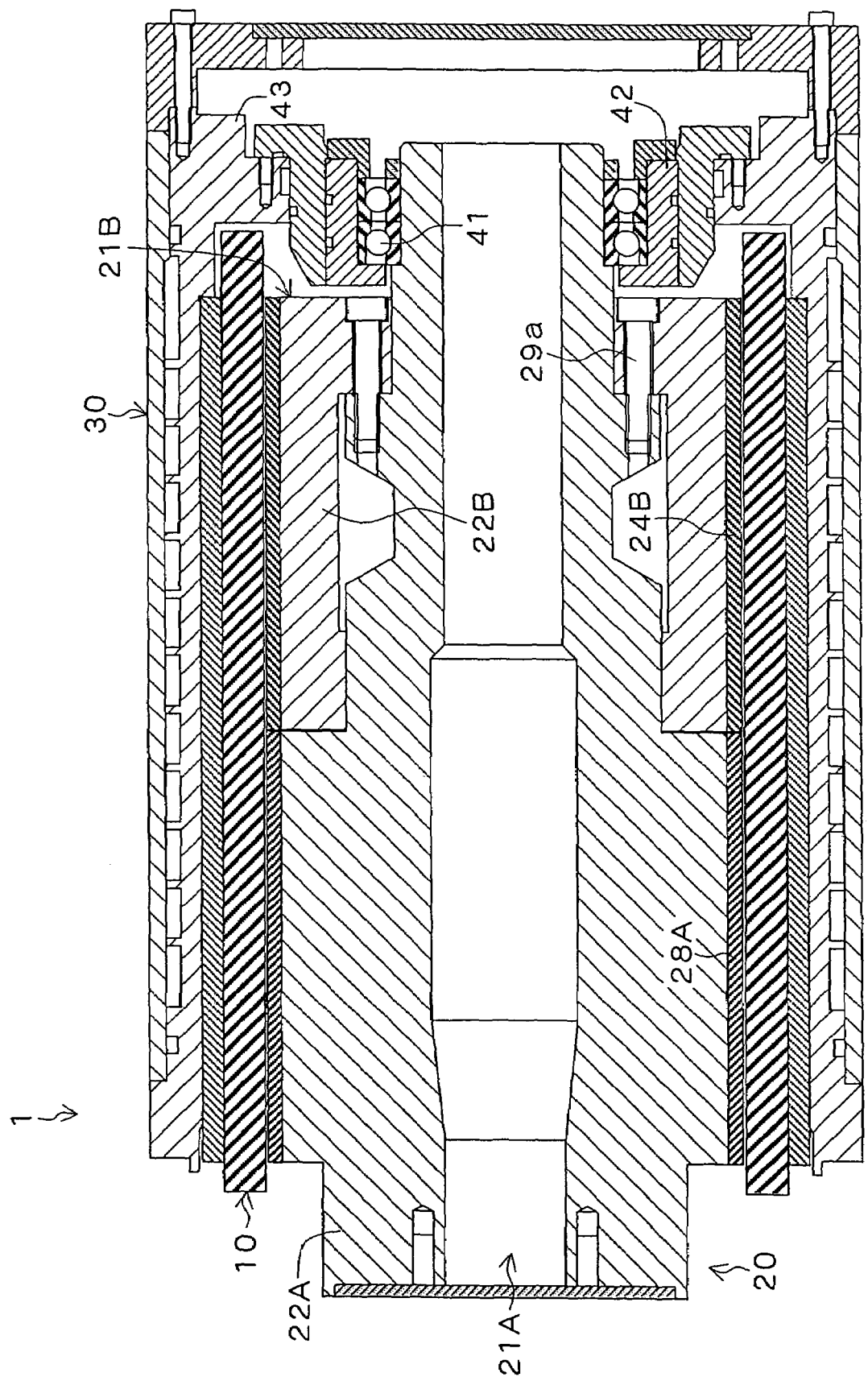
FIG. 1 is a sectional view illustrating a permanent magnet synchronous motor according to one embodiment of the present invention.

An embodiment of the present invention will hereinafter be described with reference to the attached drawings. FIG. 1 illustrates a permanent magnet synchronous motor according to the embodiment of the present invention. As shown, the permanent magnet synchronous motor 1 is of a rotating magnetic field type, and includes a hollow cylindrical stator 10 which generates a rotating magnetic field, and a rotor 20 having fixed magnetic poles and inserted in the stator 10. The rotating magnetic field is generated by applying a three-phase alternating current to the stator 10, and the rotor 20 is rotated in the stator 10 by torque applied to the magnetic poles of the rotor 20 by the rotating magnetic field.

Figure 2A:
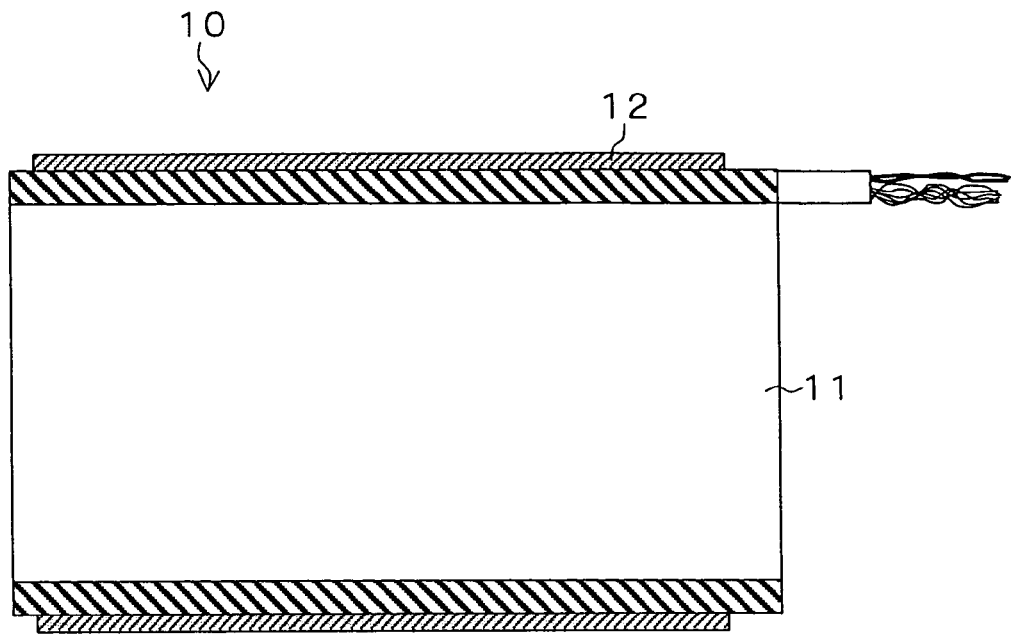
FIGS. 2a and 2b are sectional views respectively illustrating a stator and a rotor of the permanent magnet synchronous motor.

As shown in FIG. 2a, the stator 10 of the hollow cylindrical shape is prepared by winding a coil 11 around an iron core 12 and molding the coil 11 and the iron core 12 with a resin. As shown in FIG. 1, the stator 10 is fitted in a hollow cylindrical outer case 30 formed with a helical heat-sink groove.

As shown in FIG. 1, one end of the rotor 20 is rotatably supported at one end of the outer case 30 by bearings 41 and annular members 42, 43. The other end portion of the rotor 20 projects from the other end of the stator 10, and is connected to a coupling member (not shown), which is rotatably supported by a connection member (not shown) connected to the other end of the outer case 30 via a bearing.

Figure 2B:
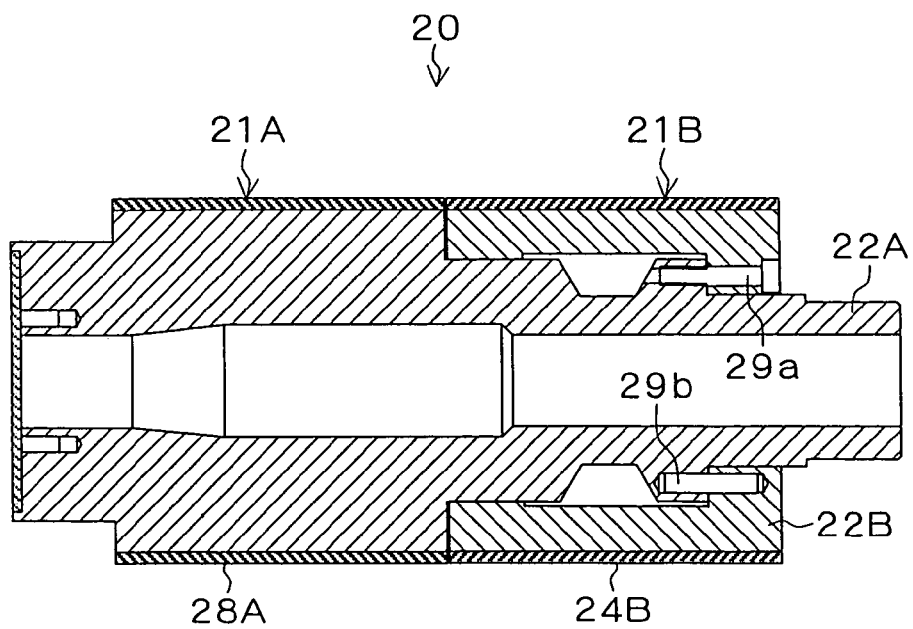
Figure 3A:
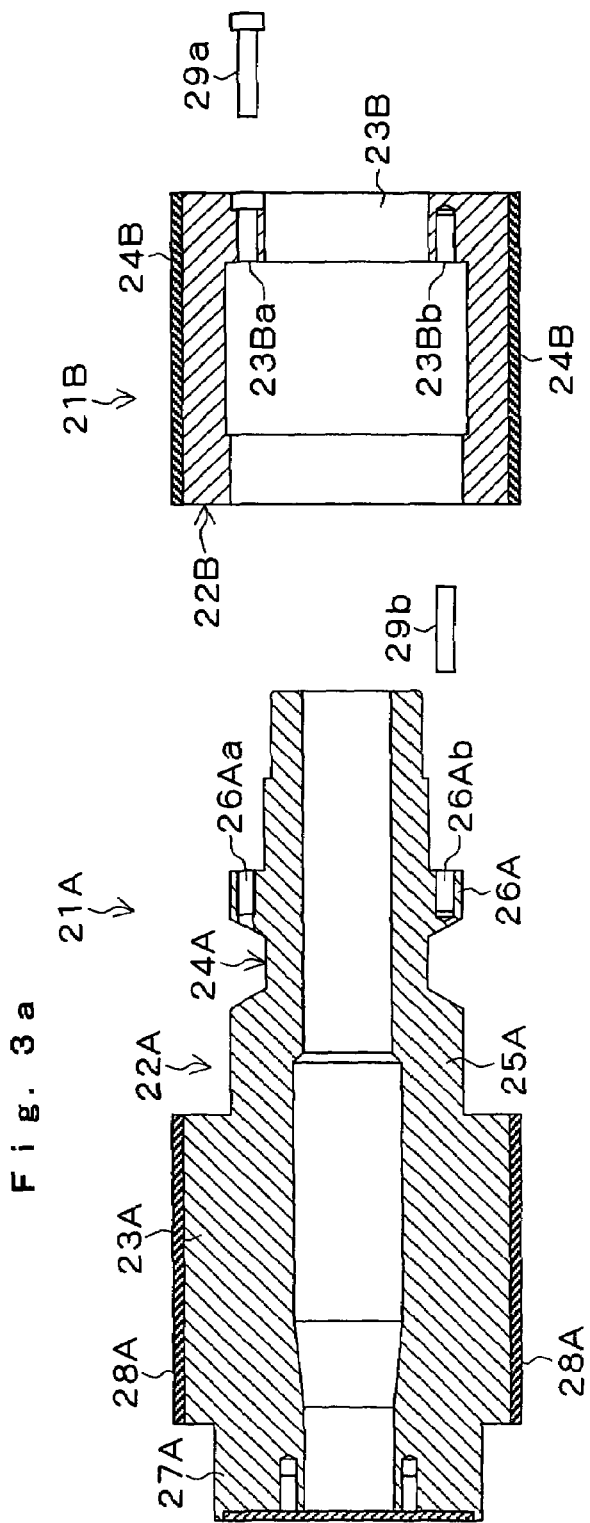
FIG. 3a is an exploded sectional view illustrating the rotor.

As shown in FIGS. 2b and 3a, the rotor 20 includes a first rotor unit 21A and a second rotor unit 21B arranged axially thereof. The first rotor unit 21A includes a rotor core 22A, and two types of elongated thin permanent magnet pieces 28A having different polarities and alternately bonded on an outer peripheral surface of the rotor core 22A. Similarly, the second rotor unit 21B includes a rotor core 22B and two types of elongated thin permanent magnet pieces 24B having different polarities and alternately bonded on the outer peripheral surface of the rotor core 22B. The rotor cores 22A and 22B are engaged with each other.

The rotor core 22A of the first rotor unit 21A includes a polygonal tubular main body 23A on which the two types of permanent magnets 28A are alternately bonded, a smaller diameter fitting portion 24A extending from one end of the main body 23A and fitted in the second rotor unit 21B, and a smaller diameter projection 27A extending from the other end of the main body 23A. With the rotor core 22B of the second rotor unit 21B fitted around the smaller diameter fitting portion 24A, a distal end portion of the fitting portion 24A projecting from the rotor core 22B is fixed to inner rings of the bearings 41 (see FIG. 1).

The rotor core 22B of the second rotor unit 21B is of a polygonal tubular shape having the same outer size as the main body 23A of the rotor core 22A of the first rotor unit 21A. The two types of permanent magnet pieces 24B having different polarities are alternately bonded on the outer peripheral surface of the rotor core 22B along the entire length.

The fixing portion 24A of the rotor core 22A has an engagement portion 25A provided in a proximal end portion thereof to be brought into fitting-engagement with the rotor core 22B of the second rotor unit 21B, and a step portion 26A provided in an axially middle portion thereof as projecting radially outward to abut against an inner flange 23B provided at the other end of the rotor core 22B.

Figure 3C:
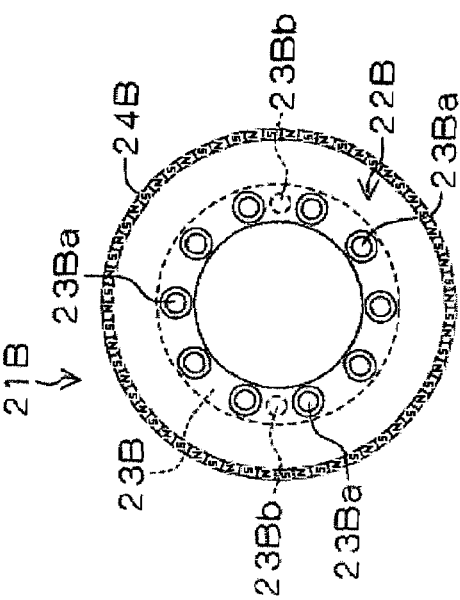
FIGS. 3b and 3c are end views respectively illustrating a first rotor unit and a second rotor unit of the rotor.
Figure 3B:
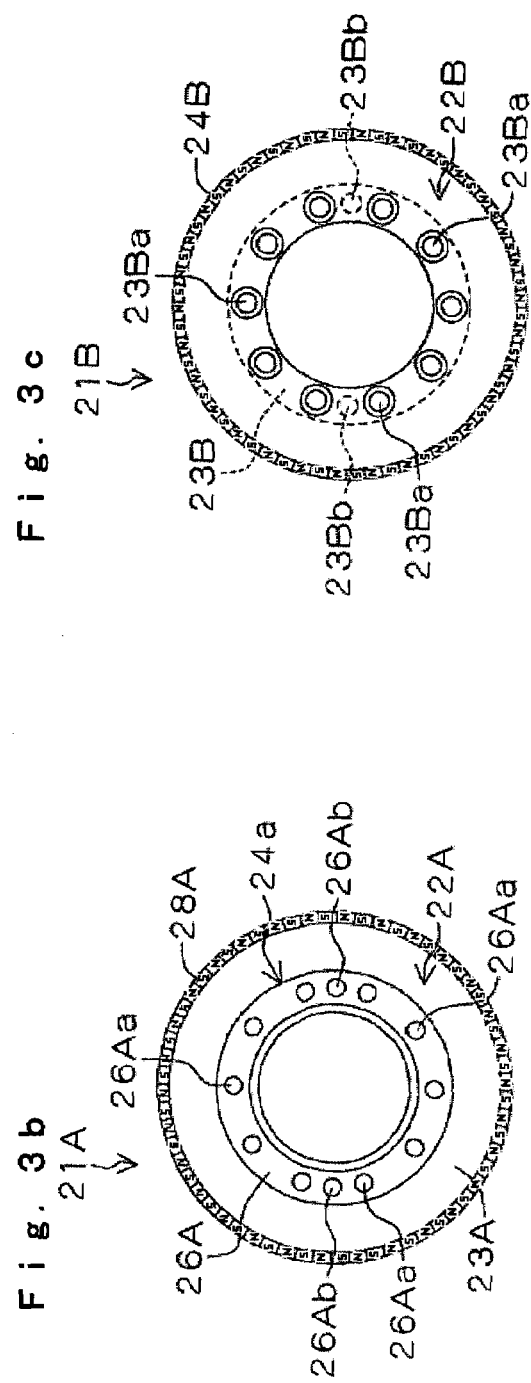

As shown in FIGS. 3a and 3b, the step portion 26A of the fitting portion 24A of the rotor core 22A has ten screw holes 26Aa in which ten bolts 29a are respectively screwed, and two pin insertion holes 26Ab in which two positioning guide pins 29b are respectively inserted. As shown in FIGS. 3a and 3c, the inner flange 23B of the rotor core 22B has ten bolt insertion holes 23Ba provided in association with the respective screw holes 26Aa of the step portion 26A of the rotor core 22A to respectively receive the ten bolts 29a, and two pin insertion holes 23Bb provided in association with the respective pin insertion holes 26Ab of the step portion 26A of the rotor core 22A to respectively receive the two guide pins 29b.

For assembling the rotor 20, the rotor core 22B of the second rotor unit 21B is fitted around the fitting portion 24A of the rotor core 22A of the first rotor unit 21A, while the guide pins 29b are inserted simultaneously into the pin insertion holes 26Ab of the rotor core 22A of the first rotor unit 21A and the pin insertion holes 23Bb of the rotor core 22B of the second rotor unit 21B. Then, the ten bolts 29a are inserted into the respective bolt insertion holes 23Ba of the rotor core 22B, and screwed into the respective screw holes 26Aa of the rotor core 22A. Thus, the rotor core 22B of the second rotor unit 21B is brought into fitting-engagement with the engagement portion 25A of the fitting portion 24A of the rotor core 22A of the first rotor unit 21A, whereby the first rotor unit 21A and the second rotor unit 21B are combined together with the polarities of the corresponding permanent magnet pieces 28A, 24B of the first and second rotor units 21A, 21B matching each other without circumferential positioning offset between the corresponding permanent magnet pieces 28A and 24B. Thus, the rotor 20 is provided.

As described above, the rotor 20 of the permanent magnet synchronous motor 1 is divided into the first rotor unit 21A and the second rotor unit 21B arranged axially thereof. Accordingly, the permanent magnet pieces 28A, 24B of the rotor units 21A, 21B each have a reduced length. Therefore, the permanent magnet pieces 28A, 24B can be accurately bonded to the outer peripheral surfaces of the rotor cores 22A, 22B of the respective rotor units 21A, 21B.

In addition, when the first rotor unit 21A and the second rotor unit 21B are combined together, the rotor units 21A, 21B are positioned in proper circumferential positional relation with respect to each other by inserting the guide pins 29b into the pin insertion holes 26Ab, 23Bb of the respective rotor cores 22A, 22B. Therefore, the corresponding permanent magnet pieces 28A and 24B of the rotor units 21A and 21B are aligned with each other with the polarities thereof matching each other without circumferential positioning offset therebetween. Thus, the rotor is free from uneven rotation.

Therefore, the bonding accuracy of the permanent magnet pieces is improved as compared with the case in which the rotor of the permanent magnet synchronous motor includes the elongated permanent magnet pieces bonded on the outer peripheral surface of the single rotor core without axially dividing the rotor core. Thus, the permanent magnet synchronous motor has higher performance with little rotation unevenness. Hence, the permanent magnet synchronous motor is free from size increase and control difficulty, which may otherwise occur in the case of the motor produced by connecting the plurality of permanent magnet synchronous motors axially to each other.

In the embodiment described above, the rotor cores 22A, 22B are positioned in proper circumferential positional relation with respect to each other by inserting the guide pins 29b into the pin insertion holes 26Ab, 23Bb respectively formed in the rotor cores 22A, 22B. Alternatively, the circumferential positioning of the rotor cores may be achieved by forming key ways in the respective rotor cores and inserting keys in the key ways.

In the embodiment described above, the rotor of the permanent magnet synchronous motor is divided into the two rotor units by way of example. Alternatively, three or more rotor units may be combined together to constitute the rotor.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A permanent magnet synchronous motor comprising:
a tubular stator; and
a rotor inserted in the stator,
wherein the rotor comprises:
a plurality of rotor units arranged axially thereof, the rotor units each including a rotor core and two types of permanent magnets having different polarities and alternately bonded on an outer peripheral surface of the rotor core;
coupling means which couples the axially arranged rotor units; and positioning means which positions the axially arranged rotor units in proper circumferential positional relation with respect to each other with the polarities of the corresponding permanent magnets of the respective rotor units in full direct contact at the point of abutment there between, and matching each other without circumferential positioning offset between the corresponding permanent magnets of the respective rotor units.

2. The permanent magnet synchronous motor of claim 1, wherein a first rotor unit of said plurality of rotor units comprises an engagement portion brought into fitting engagement with a rotor core of a second rotor unit of said plurality of rotor units, said engagement portion extending through said second rotor unit.

\* \* \* \* \*

UNITED STATES PATENT AND TRADEMARK OFFICE
CERTIFICATE OF CORRECTION

PATENT NO. : 7,355,310 B2  Page 1 of 1
APPLICATION NO. : 11/261779
DATED : April 8, 2008
INVENTOR(S) : Keizo Kashihara et al.

It is certified that error appears in the above-identified patent and that said Letters Patent is hereby corrected as shown below:

On the Title Page:

In Item (73) Assignee change "Mori Seiko Co., Ltd." to be --Mori Seiki Co., Ltd.--

Signed and Sealed this

Seventh Day of October, 2008

JON W. DUDAS
*Director of the United States Patent and Trademark Office*